United States Patent [19]
Gintert et al.

[11] 4,323,385
[45] Apr. 6, 1982

[54] NOZZLE ARRANGEMENT FOR GLASS SHEET TEMPERING APPARATUS

[75] Inventors: Dean W. Gintert, Evansville, Ind.; Raymond A. Waksmunski, Tyrone, Pa.

[73] Assignee: PPG Industries, Inc., Pittsburgh, Pa.

[21] Appl. No.: 170,470

[22] Filed: Jul. 21, 1980

[51] Int. Cl.$^3$ ............................................. C03B 27/04
[52] U.S. Cl. ........................................ 65/351; 65/348
[58] Field of Search ................ 65/114, 115, 348, 349, 65/350, 351

[56] References Cited

U.S. PATENT DOCUMENTS

| | | | |
|---|---|---|---|
| 3,186,815 | 6/1965 | Jochim | 65/115 |
| 3,294,519 | 12/1966 | Fickes | 65/348 |

FOREIGN PATENT DOCUMENTS

| | | | |
|---|---|---|---|
| 1808117 | 8/1969 | Fed. Rep. of Germany | 65/115 |
| 42-26320 | 9/1964 | Japan | 65/115 |
| 739427 | 10/1955 | United Kingdom | 65/115 |

*Primary Examiner*—Arthur D. Kellogg
*Attorney, Agent, or Firm*—Donald C. Lepiane; Edward I. Mates

[57] ABSTRACT

This invention covers an arrangement of nozzles extending from one or a pair of opposing plenum chambers of glass sheet tempering apparatus the minimizes the tendency of a large glass sheet interposed between the plenum chambers to throttle the escape of tempering medium that is applied to the central portion of the glass sheet undergoing tempering.

7 Claims, 4 Drawing Figures

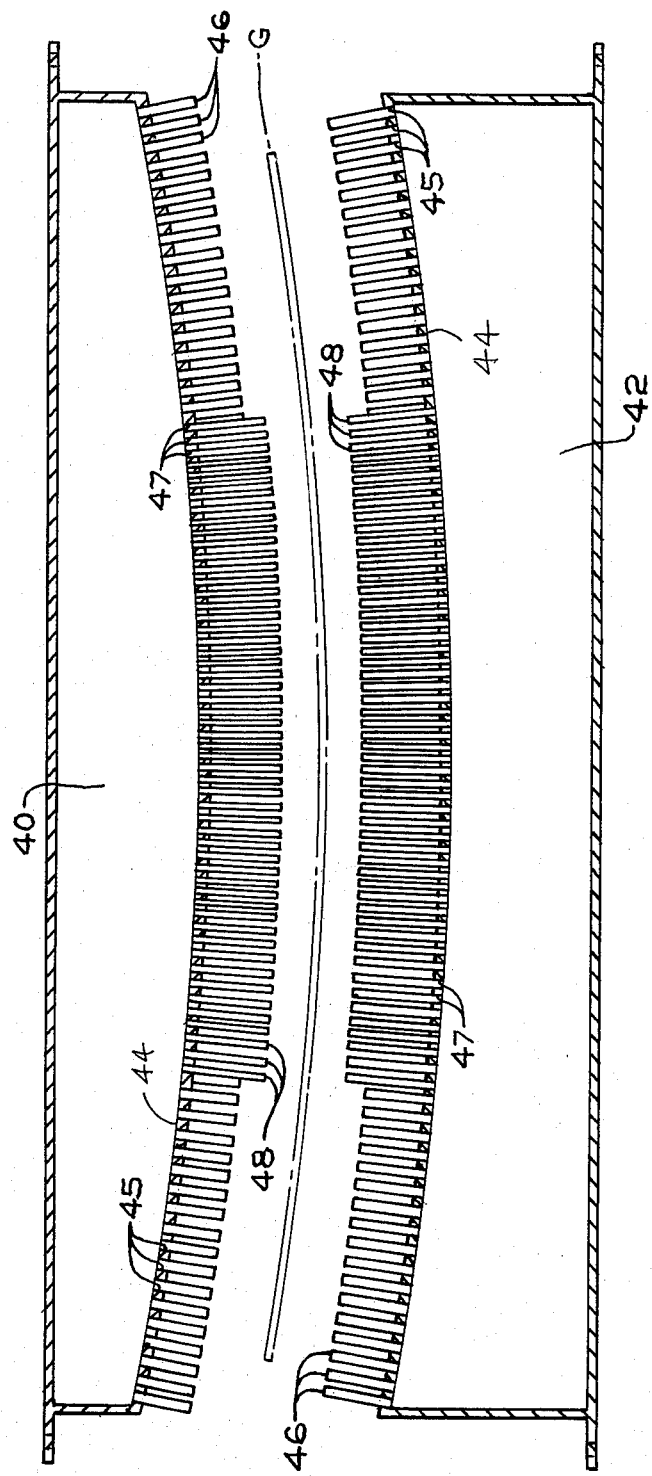

NOZZLE ARRANGEMENT FOR GLASS SHEET TEMPERING APPARATUS

BACKGROUND OF THE INVENTION

1. Field of the Invention

The present invention relates to glass sheet tempering apparatus and particularly relates to the tempering of large glass sheets, especially those that are shaped prior to being tempered. When glass sheets are tempered, each glass sheet in turn is heated above its annealing range and then rapidly cooled to set the surfaces of the glass sheet while the center is still hot. This action results in the sheet having its surfaces stressed in compression while the intermediate portion is stressed in tension.

The stress pattern imparted to temper glass results in a much stronger sheet than untempered glass, because the glass surfaces, by virtue of being stressed in compression, are much more able to withstand external forces than untempered glass sheets which are not provided with such large compression stresses in the surface area. Moreover, when the outer surface of the glass is penetrated, tempered glass breaks up into small, relatively harmless, smoothly surfaced particles. In contrast, annealed glass fractures more readily, and when fractured, breaks into relatively dangerous, large, jagged fragments.

The uniformity of the size of the shattered particles indicates the uniformity of temper of the glass. The smaller, smoother particles of shattered tempered glass are much safer than the jagged fragments of untempered glass.

More specifically, in a typical tempering operation, a glass sheet is heated nearly to its softening point and then quickly chilled by uniformly exposed the opposite surfaces of the heated glass sheet to streams of a tempering fluid, such as air, arranged to cool both surfaces uniformly and simultaneously. The fluid is disposed through two opposed, spaced plenum chambers, each provided with a set of nozzles. Each set of nozzles faces a different major surface of the glass sheet.

The prior art considered it a prerequisite to uniform tempering to have an even distribution of the cooling air over the glass surfaces. This is usually accomplished by blasting air through a plurality of identical, uniformly spaced, elongated nozzles extending through apertures in apertured walls of the plenum chambers. The nozzles are either reciprocated transversely of their length through an amplitude sufficient to insure that each increment of the glass sheet area is swept by at least one of the reciprocating nozzles. This distance between the nozzle orifices and the adjacent sheet surfaces have been kept as uniform as possible in order to strive for the goal of uniform tempering of the glass sheet.

It is necessary to impart relative movement between the nozzles moving in unison relative to the glass sheet to avoid nonuniform cooling of the glass. When the nozzles are not moved relative to the major glass surfaces or vice versa, the tempering medium blasts are directed against fixed locations on the glass. Fixed air blasts cool the fixed locations opposite the blasts rapidly while other locations adjacent to the fixed locations are not cooled as rapidly. Without such relative movement, patterns of iridescence form on the surface of the tempered glass. These patterns of iridescence are very annoying when viewed in reflection or in polarized light.

By providing relative movement of the nozzles relative to the major surfaces of the glass sheet, and by applying the stream of air or other tempering medium through the nozzles by pressure from a common source, prior art tempering apparatus provided substantially uniform tempering for flat glass and gently curved glass of relatively small and intermediate sizes. However, as the size and/or shape of automobile backlights and sidelights became larger and more complicated, it has become more and more difficult to temper glass sheets adequately. It has become necessary to supply air or other tempering medium at a greater rate of flow per unit area for larger sizes than for smaller sizes in order to assure that the glass is adequately tempered.

The glass sheet tempering art has developed many techniques for imparting relative motion between the nozzles that face the opposite surfaces of the glass sheet and the major surfaces of said sheet. Some of these involve linear reciprocation of the nozzles in unison. Others involve linear reciprocating movement of glass sheets past a pair of arrays of fixed opposing nozzles. Others involve applying elliptical or circular orbital movement of nozzles relative to a glass sheet supported at a fixed position.

The prior art recognized that one of the problems of inadequate tempering of large glass sheets and or those having complicated curvatures resulted from the inability of the air blasted against the central portion of the glass sheet to escape from between the central portion of the glass sheet and the apertured walls of the plenum chambers so as to enable fresh cool tempering medium to replace the spent tempering medium that impinged on the glass. The prior art recognized the correlation of the long escape path from the center to the edge of the glass sheet with inadequate center portion temper. According to one proposal to solve this problem, the wall of each plenum chamber facing the central portion of a glass sheet undergoing quenching has a greater proportion per unit area apertured than the remainder of the wall facing the portion of the glass sheet surrounding the central portion. Such a construction causes a slight pressure gradient in the tempering medium from the central region to the outermost regions of the space within which the glass sheet is supported between the plenum chambers for tempering. This slight pressure gradient results in a continuous outward flow from the central portion of the glass to its margin and helps remove air from the vicinity of the glass sheet surface after the relatively cool air supplied through the apertured wall of the plenum chamber has engaged the heated glass surface to chill the latter and has in turn been heated by said engagement.

Providing larger openings in the apertured walls of the plenum chamber in the center portion than in the portions beyond the central portion requires an increase in power to operate compressors or fans that supply cool air to the plenum chambers for delivery through the various nozzles. In view of the increasing cost of energy in recent years, it would be desirable to develop an alternate technique that does not involve the use of so much energy to develop a desired degree of temper.

2. Description of Patents of Interest

U.S. Pat. No. 3,186,815 to Jochim discloses a glass tempering apparatus designed to temper different portions of the glass to different degrees of temper by providing a separate set of nozzles moveable relative to the remaining tempering nozzles in a direction parallel to the thickness of a glass sheet being tempered. The purpose of this invention is to provide different portions of the tempered glass sheet with different properties that are associated with different degrees of temper.

U.S. Pat. No. 3,294,519 to Fickes discloses glass sheet tempering apparatus in which air under pressure is supplied to a pair of opposed plenum chambers and imparted through nozzles having a larger proportion of tempering medium-imparting area per unit cross section area in the central portion compared to that of the portions exterior of the central portion. The purpose of this patent is to increase the flow rate of tempering medium against the central portion of the glass sheet undergoing tempering so as to cause a pressure gradient in the tempering medium parallel to the major surfaces of the glass sheet from the central region to the marginal portion of the glass sheet.

The pressure gradient so established permits tempering medium to escape more readily from the central portion of the glass sheet after it chills the glass surfaces, permitting the application of additional tempering medium, particularly in the central portion of the glass sheet. Establishing the pressure gradient in this manner provides additional power to provide additional flow of cold tempering medium in the central region of the plenum chamber which faces the central region of the glass sheet. The need for additional power consumption to insure adequate temper in the central portion of large glass sheets leaves something to be desired and it would be desirable for the glass sheet tempering art to develop a way of tempering glass sheets at minimum power consumption while permitting the tempering medium applied to the opposite major surfaces of the glass sheet to escape readily throughout the entire extent including its central portion between the apertured walls of the plenum chamber and the major surfaces of the glass sheet.

SUMMARY OF THE INVENTION

It has now been found that glass sheets can be tempered substantially uniformly throughout their entire extent by utilizing plenum chambers having apertured walls facing the opposite major surfaces of the glass sheet wherein the apertures are constructed and arranged to be smaller and more closely spaced in their central portion that faces the central portion of the glass sheet during tempering than the apertures provided in the wall outside the central portion. Another optional characteristic of the present invention involves the arrangement of nozzles extending from each of the apertures toward the surface of the glass sheet wherein longer nozzles extend from the smaller apertures to face the central portion of the glass sheet and shorter nozzles extend from the apertures outside the central portion of the apertured walls. The longer nozzles may have a narrower cross-section than the shorter nozzles.

Each of the several features just enumerated may be used by itself. However, a combination of all the features enumerated provide an optimum improvement in operation of tempering apparatus that requires a minimum of energy to obtain a given temper level in the glass sheet. In other words, optimum efficiency is obtained when the plenum chambers of the tempering apparatus of the present invention are provided with apertured walls having a greater number of relatively small apertures per unit area in their central portion and the remainder of each wall is provided with a lesser number of relatively large apertures per unit area. Furthermore, nozzles extending from said apertures are constructed and arranged so that the nozzles extending from the relatively small diameter, more closely spaced apertures of the central portion of the wall are longer and narrower and have their ends closer to the major surface of the glass sheet than the relatively widely spaced nozzles of relatively larger cross-section that extend from the remaining apertures in the apertured wall.

While the apertured walls may be flat and parallel to one another and spaced apart a sufficient distance to enable a flat sheet of glass to pass therebetween for cooling, it is also understood that the walls may be curved to conform to the shape of the glass sheet undergoing cooling during the tempering process so that the ends of the nozzles in the central portion lie in curved surfaces approximately parallel to and relatively closely spaced to the adjacent major surfaces of the glass sheet undergoing tempering, whereas the nozzles extending from the remainder of the apertured walls terminate at ends located in curved surfaces approximately parallel to and spaced a relatively greater distance from the curved major surface of the glass sheet undergoing tempering.

These and other characteristics of the present invention will be understood in the light of the description of certain preferred embodiments thereof which follows.

BRIEF DESCRIPTION OF THE DRAWINGS

In the drawings that form part of the description of the present invention and wherein like reference numbers refer to like structural elements.

FIG. 3 is a horizontal sectional view of a second embodiment of apparatus for tempering certain curved backlights comprising plenum chambers having complementary, curved apertured walls and provided with nozzles constructed and arranged according to the present invention.

DESCRIPTION OF THE PREFERRED EMBODIMENT

Figure 1:
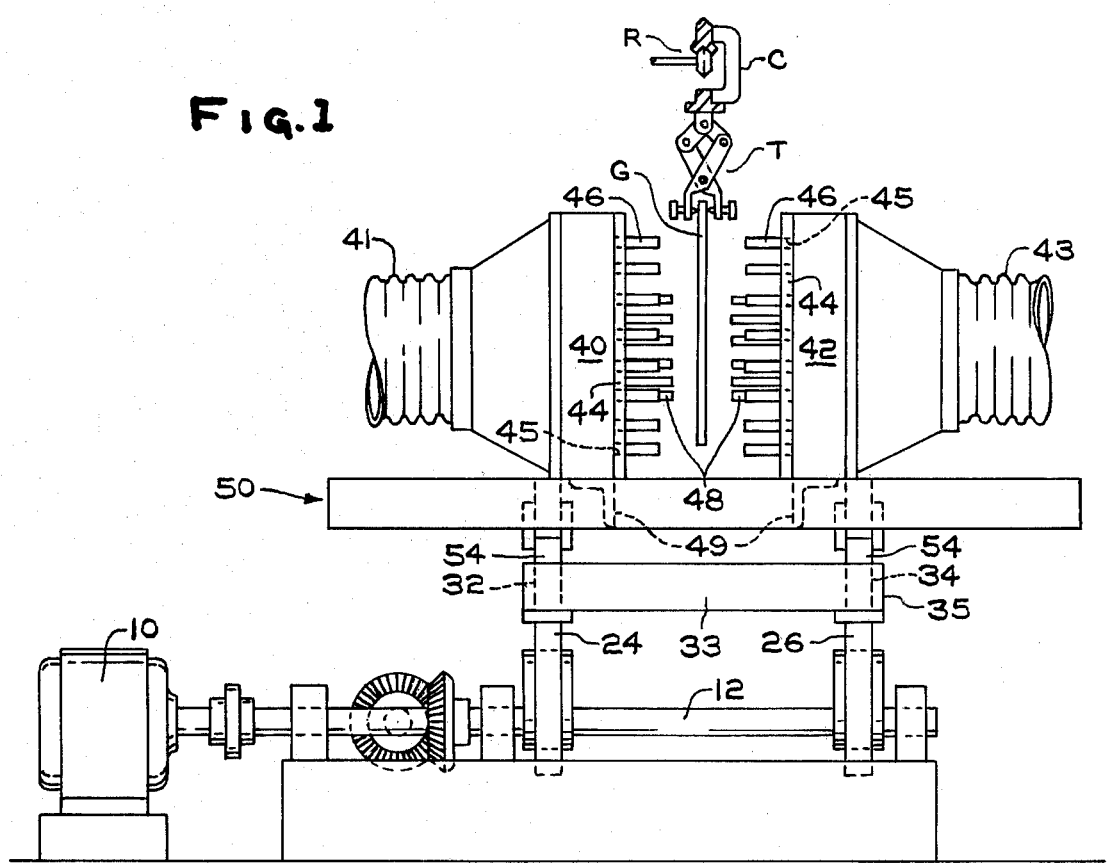
FIG. 1 is an end assembly view, partly in phantom, of flat glass sheet tempering apparatus modified according to the present invention.

Referring to the drawings, a drive motor 10 operates through a main drive shaft 12, a pair of eccentrics 24 and 26, and horizontal longitudinal members 32 and 34 comprising a lower skeleton structure 35. The eccentrics connecting the skeleton structure to the drive motor cause the skeleton structure to move in a repetitive path. For the handling of flat glass sheets as depicted in FIG. 1, the path is a closed circular orbit in a vertical plane actuated by operation of the drive motor 10.

Vertical beams 54 interconnect the lower skeleton structure 35 with an upper skeleton structure 60. The latter reinforces and supports a pair of plenum chambers 40 and 42 for movement defined by eccentrics 24 and 26. However, if desired, the skeleton structures 35 and 60 may be mounted relative to actuating cams in the manner depicted in U.S. Pat. No. 3,849,100 to Antonio Luppino, the description of which is incorporated by reference herein. The Luppino patent makes it possible to move the plenum chambers 40 and 42 in unison in closed circular orbits or rectilinear reciprocating paths that are either horizontal or vertical in planes flanking the plane of support for the glass sheet.

The plenum chamber 40 is rigidly connected to one side of the upper skeleton structure 60 through a horizontal angle beam 49. A flexible conduit 41 provides tempering medium under pressure from a pressurized source (not shown) to plenum chamber 40. On the opposite side of a position occupied by a glass sheet G gripped at its upper edge by a pair of self closing tongs T supported on a carriage C that rides on a roller conveyor R, another plenum chamber 42 is connected to the upper skeleton structure 60 through another horizontal angle beam 49. The plenum chamber 42 is connected via a flexible conduit 43 to the source of tempering medium under pressure (not shown). Means (not shown) is provided to independently control the flow of tempering medium into plenum chamber 40 and plenum chamber 42. The latter means may comprise suitable control valves.

An apertured wall 44 is provided at the inner end of each plenum chamber. Apertures 45 are provided throughout the entire extent of the apertured walls 44 except for their central portions to support fixed ends of elongated nozzles 46. In the central portion of the apertured wall 44, apertures 47 support fixed ends of elongated nozzles 48. The apertures 47 have smaller cross sections than the apertures 45 and are more closely spaced relative to one another than the apertures 47. Furthermore, the nozzles 46 and 48 have cross-sections designed to fit into the apertures 45 and 47, respectively, from which they extend toward the position occupied by the glass sheet G. The nozzles 48 are longer than the nozzles 46 and have walls with smaller internal cross sections than those of the nozzles 46 for reasons to be described later.

According to a specific embodiment of the present invention, the apertures 47 in the central portions of the apertured plates 44 have a diameter to receive the outer surface of a quarter inch schedule 40 (0.364 inch or 9.25 mm inner diameter and 0.540 inch or 13.72 mm outer diameter) tubes of aluminum and are arranged in spaced relation along rows at one and a quarter inch (31.75 mm) centers. The remaining apertures 45 are adapted to receive ⅜ inch schedule 40 (0.493 inch or 12.52 mm inner diameter and 0.675 inch or 17.15 mm outer diameter) aluminum tubes and are disposed at 2 inch (50.8 mm) centers along each row. The apertures in alternate rows are offset midway between the apertures of the adjacent rows. The distances between the center lines of adjacent rows approximate the center to center distance between adjacent nozzles in each row.

The nozzles 46 extend three inches (76.2 mm) from the outer surfaces of the apertured walls 44. The nozzles 48 extend 4 inches (101.6 mm) from the outer surface of the apertured walls 44.

When glass sheets to be tempered are curved, heated backlights, the plenum chamber 42 has its apertured wall 44 shaped about a vertical axis to a radius of 237 inches (5842 mm) convexly outward from the plenum chamber 42. The apertured wall 44 of plenum chamber 40 is shaped concavely about a vertical axis to a curved shape parallel to that of the apertured wall of plenum chamber 42. This configuration with the nozzles extending toward a curved glass sheet G is depicted in FIG. 3.

It is understood that when a glass sheet is supported with its longitudinal dimension extending horizontally and is curved about an axis extending generally parallel to its vertical dimension, the skeleton structures 35 and 60 interconnected by the vertical beams 54 will be reciprocated linearly in a vertical direction. To accomplish rectilinear reciprocation in a vertical direction vertical guides and links are provided in conjunction with the eccentrics 24 and 26 to insure linear vertical reciprocation of the plenum chambers 40 and 42.

Figure 4:
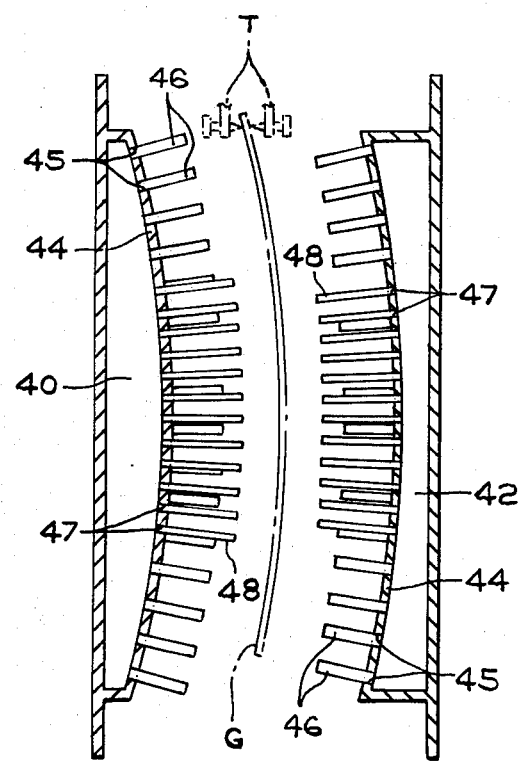
FIG. 4 is a vertical sectional view of a third embodiment of this invention, showing how nozzles are arranged for tempering apparatus having plenum chambers with curved apertured walls constructed and arranged to temper sidelights that are curved about a horizontally extending axis.

In case the apparatus is used to temper curved sidelights as depicted in FIG. 4, wherein the glass sheet is supported in such a manner that its horizontal dimension extends substantially parallel to its axis of curvature, the eccentrics 24 and 26 are connected through links to horizontal guides that guide the movement of the plenum chambers 40 and 42 in horizontal paths parallel to the axis of bending for the sidelight being tempered.

Figure 2:
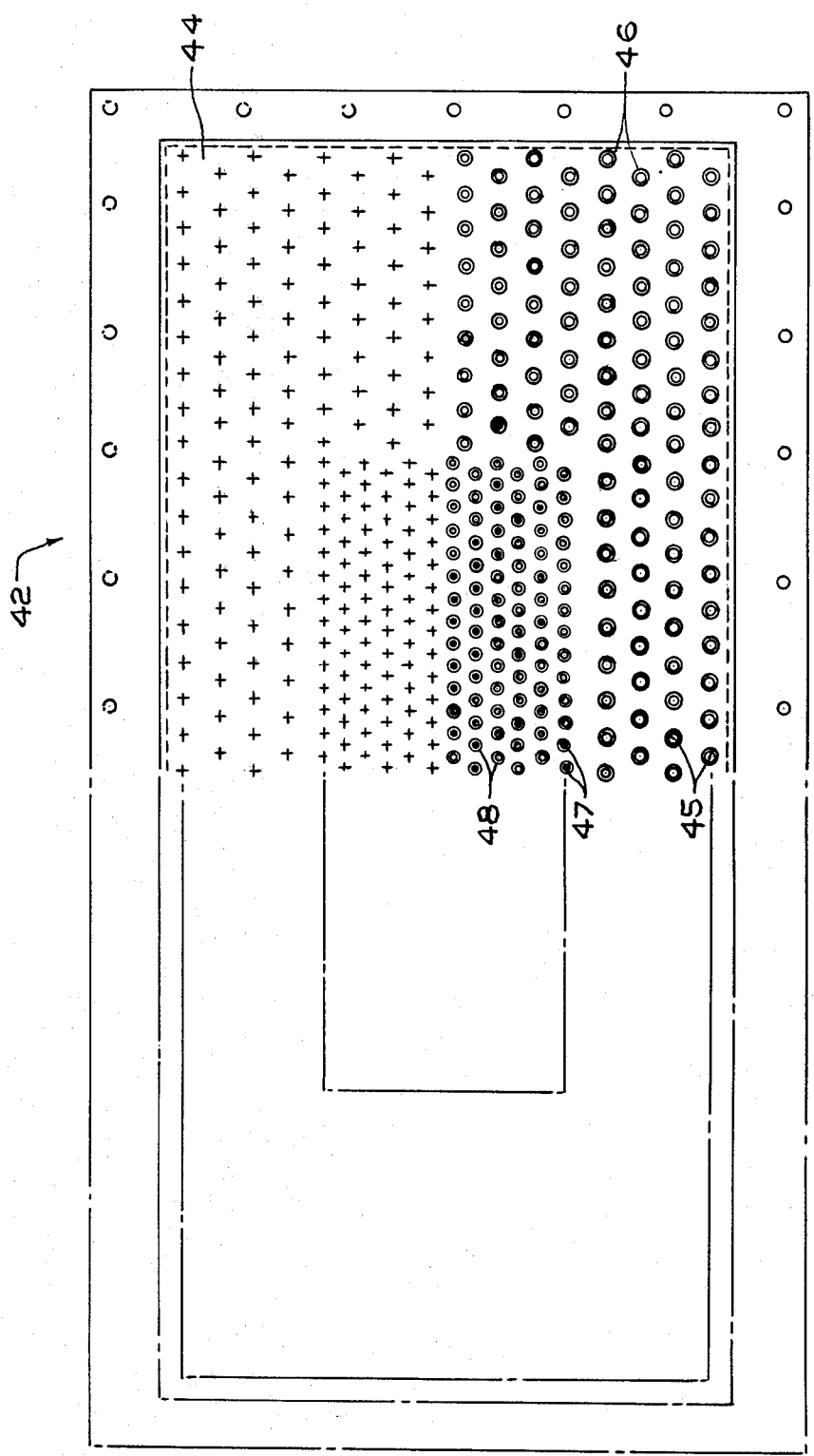
FIG. 2 is a frontal view, partly in phantom, of one of the apertured walls of one of the plenum chambers of the apparatus depicted in FIG. 1.

The smaller diameter of the nozzles in the central portion 48 and a closer spacing therebetween when compared to the diameter and spacing of the outer nozzles 46 as shown in FIG. 2 causes air from a single supply source to the associated plenum chamber to direct a larger volume of air per plenum surface area toward the central portion of the glass sheet supported intermediate the plenum chambers 40 and 42 than toward the portions of the glass sheet outside of said central portion.

Furthermore, since the nozzles 48 extending from the central portion of the plenum chambers are longer than the nozzles 46 extending from the portions outside the central portions of the plenum chambers, the velocity of the air or other tempering medium applied toward the central portion of the opposite major surfaces of the glass sheet G is relatively higher than the velocity of tempering medium applied outside said central portion. This velocity differential develops a higher heat transfer rate in the central portion of the glass sheet than elsewhere. While any of the three characteristics described herein would establish a nonuniform air pattern, the combination of all of these three factors establishes a pressure gradient in the space occupied by the glass sheet being tempered between the apertured plates of the plenum chambers to cause the tempering medium to be diverted outward toward the edges of the glass sheet. This outward diversion of tempering medium reduces the likelihood of establishing a centrally disposed area of stagnant air. Since the air is removed from the vicinity of the central portion of the glass sheet, new air supplied through the nozzles 48 toward the central portion of the glass sheet while air at a reduced pressure is applied outwardly thereof causes this diversion of movement of tempering medium to continue as long as the glass sheet is cooled by directing tempering medium toward its surfaces.

It is understood that while the description of the preferred illustrative embodiments of the present invention have been described in terms of tempering apparatus that uses tongs to suspend glass sheets in their vertical plane during the tempering operation, it is understood that the tempering apparatus of the present invention can be modified to handle glass sheets that are either flat or curved and supported in other orientations, particularly in essentially horizontal orientation, or to handle glass sheets supported in essentially upright orientations by supporting means other than tongs.

The description of preferred illustrative embodiments has been for the purpose illustration rather than limitation. The dimensions and operating conditions recited are included for the description of the illustrative embodiments and are subject to change without departing from the gist of this invention. It is understood that various other changes well known in the glass tempering art may be made depending upon the shape of glass sheet to be handled without departing from the gist of the invention as defined in the claimed subject matter that follows.

We claim:

1. An apparatus for tempering a glass sheet by blasting cool tempering medium against opposed major surfaces of a heated glass sheet, comprising:
    first means for directing streams of tempering medium;
    second means for directing streams of tempering medium;
    means for mounting said first and second directing means in facing relationship to direct their respective streams of tempering medium through a common tempering position; and
    each of said first and second directing means includes a plurality of discrete spaced orifices each having a cross-sectional area with the cross-sectional area of the innermost orifices facing central portion of the common tempering position having a higher orifice density than the orifice density facing portions outside the central portion of the common tempering position and the cross-sectional area of the innermost orifices being smaller than the cross-sectional area of the outermost orifices with orifices adjacent one another in a direction from the outermost orifice to the innermost orifice being approximately equal in cross-sectional area or having a smaller cross-sectional area to facilitate escape of spent tempering medium from the central portion of the common tempering position.

2. The apparatus as set forth in claim 1 wherein the orifices are end openings of nozzles and each of said directing means includes a plenum chamber, each of said plenum chambers having an apertured inner wal facing the tempering position and said nozzles extending from apertures arranged throughout the extent of said apertured inner walls, said nozzles in the central portion of said apertured walls being longer than nozzles in the apertures beyond the central portion of said apertured walls.

3. The apparatus as set forth in claim 1 whereind the orifices are end openings of a plurality of nozzles, said nozzles adjacent central portion of the tempering position being longer than said nozzles beyond the central portion.

4. The apparatus as set forth in claim 1 wherein each of said directing means includes a plenum chamber comprising a wall in spaced relation and facing the common tempering position and said orifices are apertures in said wall in which the construction and arrangement of said apertures is such that the proportion of open area in the central portion is greater than the proportion beyond the central portion so that when tempering medium is applied through said apertures of said plenum chambers, a slight pressure gradient results from the central portion to the outer portions to facilitate escape of spent tempering medium.

5. The apparatus as set forth in claim 2 or 3 wherein said nozzles extending from the apertures in the central portion of said apertured inner walls are more closely spaced than said nozzles extending from the apertures beyond the central portion.

6. The apparatus as set forth in claim 2 wherein said apertured wall of each of said plenum chambers is curved and said nozzles extending from the central portion of said apertured wall terminate in ends located in a curved surface approximately parallel and relatively closely spaced to curved major surface of a glass sheet to be tempered and said nozzles extending from the portion beyond the central portion terminate in ends located in a curved surface approximately parallel to and spaced a relatively greater distance from the curved surfaces of the sheet to be tempered.

7. The apparatus as set forth in claim 8 wherein one of said plenum chambers has its apertured wall curved convexly to face a concavely shaped major surface of the curved glass sheet to be tempered and the other of said plenum chambers having its apertured wall curved concavely to face a convexly shaped major surface of the curved glass sheet to be tempered.

* * * * *

UNITED STATES PATENT AND TRADEMARK OFFICE
CERTIFICATE OF CORRECTION

PATENT NO. : 4,323,385
DATED : April 6, 1982
INVENTOR(S) : Dean W. Gintert and Raymond A. Waksmunski It is certified that error appears in the above–identified patent and that said Letters Patent are hereby corrected as shown below:

In the Abstract, line 3, change "the" to --that--.

In Claim 2, line 4, change "wal" to --wall--.

In Claim 3, line 1, change "whereind" to --wherein--.

In Claim 7, line 1, change "8" to --6--.

Signed and Sealed this

Twenty-ninth Day of June 1982

[SEAL]

Attest:

Attesting Officer

GERALD J. MOSSINGHOFF
Commissioner of Patents and Trademarks